(12) United States Patent
Das et al.

(10) Patent No.: US 10,480,945 B2
(45) Date of Patent: Nov. 19, 2019

(54) MULTI-LEVEL LOCATION DISAMBIGUATION

(71) Applicant: QUALCOMM Incorporated, San Diego, CA (US)

(72) Inventors: Saumitra Mohan Das, Santa Clara, CA (US); Vinay Sridhara, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 799 days.

(21) Appl. No.: 13/658,717

(22) Filed: Oct. 23, 2012

(65) Prior Publication Data

US 2014/0032161 A1  Jan. 30, 2014

Related U.S. Application Data

(60) Provisional application No. 61/675,275, filed on Jul. 24, 2012.

(51) Int. Cl.
| | | |
|---|---|---|
| *G01C 5/06* | (2006.01) | |
| *G01C 21/00* | (2006.01) | |
| *G01S 5/00* | (2006.01) | |

(52) U.S. Cl.
CPC ............ *G01C 21/00* (2013.01); *G01S 5/0009* (2013.01); *G01C 5/06* (2013.01)

(58) Field of Classification Search
CPC .................... G01C 5/06; G01C 21/206; G01S 5/009–5/0257
See application file for complete search history.

(56) References Cited

U.S. PATENT DOCUMENTS

| | | | | |
|---|---|---|---|---|
| 7,162,368 B2* | 1/2007 | Levi | .................. | G01C 5/06 |
| | | | | 701/300 |
| 8,874,398 B2* | 10/2014 | Raghupathy | ............ | G01S 5/021 |
| | | | | 342/357.29 |

(Continued)

FOREIGN PATENT DOCUMENTS

| | | |
|---|---|---|
| CN | 101512376 A | 8/2009 |
| CN | 102075936 A | 5/2011 |

(Continued)

OTHER PUBLICATIONS

Hui Wang, Henning Lenz, Andrei Szabo, Uwe D. Hanebeck, and Joachim Bamberger; "Fusion of Barometric Sensors, WLAN Signals and Building Information for 3-D Indoor/Campus Localization;" Apr. 13, 2006, In proceedings of International Conference on Multisensor Fusion and Integration for Intelligent Systems (MFI 2006), pp. 1-7.*

(Continued)

*Primary Examiner* — Mohamed Charioui
*Assistant Examiner* — Christine Y Liao
(74) *Attorney, Agent, or Firm* — Hunter Clark PLLC

(57) ABSTRACT

A method of disambiguating a location of a mobile station within a structure includes: obtaining, at the mobile station, regional pressure indications and corresponding region indications indicating regions within a structure that are vertically displaced with respect to each other, each of the regional pressure indications indicating atmospheric pressure information associated with the corresponding region; determining mobile station pressure information associated with a present location of the mobile station; comparing the mobile station pressure information with the regional pressure indications; and based on the comparing, determining in which of the regions the mobile station presently resides.

34 Claims, 11 Drawing Sheets

(56) References Cited

U.S. PATENT DOCUMENTS

| | | | |
|---|---|---|---|
| 2003/0136191 A1* | 7/2003 | Tsuji | G01C 5/06 73/384 |
| 2008/0019299 A1 | 1/2008 | Lekutai et al. | |
| 2009/0286556 A1* | 11/2009 | Yumoto | G01C 21/20 455/456.6 |
| 2010/0049469 A1* | 2/2010 | Wirola et al. | 702/150 |
| 2010/0073229 A1 | 3/2010 | Pattabiraman et al. | |
| 2011/0126119 A1 | 5/2011 | Young et al. | |
| 2011/0177809 A1 | 7/2011 | Pakzad et al. | |
| 2011/0195701 A1 | 8/2011 | Cook et al. | |
| 2011/0246148 A1 | 10/2011 | Gupta et al. | |
| 2012/0072110 A1 | 3/2012 | Venkatraman | |
| 2012/0293372 A1* | 11/2012 | Amendolare | G01S 5/02 342/451 |
| 2013/0325385 A1* | 12/2013 | Shin et al. | 702/94 |
| 2015/0025817 A1* | 1/2015 | Ten Kate | A61B 5/1117 702/50 |

FOREIGN PATENT DOCUMENTS

| | | |
|---|---|---|
| EP | 2048854 A1 | 4/2009 |
| WO | 0058744 A1 | 10/2000 |
| WO | 2011121392 A1 | 10/2011 |

OTHER PUBLICATIONS

International Search Report and Written Opinion—PCT/US2013/043526—ISA/EPO—dated Oct. 17, 2013.

International Preliminary Report on Patentability—PCT/US2013/043526, The International Bureau of WIPO—Geneva, Switzerland, Jan. 19, 2015, 7 pgs.

Written Opinion of the International Preliminary Examining Authority—PCT/US2013/043526—IPEA/EPO—dated Sep. 5, 2014.

Partial International Search Report—PCT/ US2013/043526—ISA/EPO—dated Aug. 21, 2013.

* cited by examiner

MULTI-LEVEL LOCATION DISAMBIGUATION

CROSS-REFERENCE TO RELATED APPLICATIONS

This application claims the benefit of U.S. Provisional Application No. 61/675,275 filed Jul. 24, 2012, entitled "Multi-Level Location Disambiguation," which is incorporated herein by reference for all purposes.

BACKGROUND

Disambiguating between different indoor regions of a structure can be difficult using transceivers, especially short-range wireless transceivers (e.g., WiFi access points, femtocells, Zigbee transceivers, Bluetooth® transceivers, etc.), alone. For example, indoor regions may be different floors of a building or portions of floors in a building or different portions of a floor. In this case, signals from wireless transceivers (WTs) in different regions can be received by a single mobile station (MS). Even though the MS is in a first region, the signal strength received from a WT in a second, different, region may be stronger than the signal strength of a signal received from a WT in the first region. This is especially true near portals such as staircases and elevator shafts, e.g., due to waveguide effects of these structures.

SUMMARY

An example method of disambiguating a location of a mobile station within a structure includes: obtaining, at the mobile station, regional pressure indications and corresponding region indications indicating regions within the structure that are vertically displaced with respect to each other, each of the regional pressure indications indicating atmospheric pressure information associated with a corresponding region; determining mobile station pressure information associated with a present location of the mobile station; comparing the mobile station pressure information with the regional pressure indications; and based on the comparing, determining in which of the regions the mobile station presently resides.

An example of a mobile station includes: an antenna; a transceiver communicatively coupled to the antenna to transmit outbound wireless communications to, and receive inbound wireless communications from, a wireless transceiver; a pressure sensor configured to determine atmospheric pressure on the mobile station; and a processing unit communicatively coupled to the transceiver and the pressure sensor and configured to: obtain regional pressure indications and corresponding region indications indicating regions within a structure that are vertically displaced with respect to each other, each of the regional pressure indications indicating atmospheric pressure information associated with a corresponding region; determine, from communication with the pressure sensor, mobile station pressure information associated with a present location of the mobile station; make a comparison of the mobile station pressure information and the regional pressure indications; and based on the comparison, determine in which of the regions the mobile station presently resides.

An example of a computer-readable storage device includes processor-readable instructions configured to cause a processor to: obtain regional pressure indications and corresponding region indications indicating regions within a structure that are vertically displaced with respect to each other, each of the regional pressure indications indicating atmospheric pressure information associated with a corresponding region; determine, from communication with a pressure sensor, mobile station pressure information associated with a present location of a mobile station; make a comparison of the mobile station pressure information and the regional pressure indications; and based on the comparison, determine in which of the regions the mobile station presently resides.

Another example of a mobile station includes: a pressure sensor configured to determine atmospheric pressure; obtaining means for obtaining regional pressure indications and corresponding region indications indicating regions within a structure that are vertically displaced with respect to each other, each of the regional pressure indications indicating atmospheric pressure information associated with a corresponding region; and determining means, communicatively coupled to the pressure sensor and the obtaining means, for determining in which of the regions the mobile station presently resides based upon mobile station pressure information associated with a present location of the mobile station, the regional pressure indications, and the corresponding region indications.

An example method of generating a pressure map for a structure includes: receiving, at a server, indications of pressure associated with corresponding regions of the structure; organizing, at the server, the indications of pressure and indications of the corresponding regions into a pressure map of pressure information and the indications of the corresponding regions; and conveying the pressure map from the server to a mobile station within the structure.

An example method of providing pressure information includes: monitoring pressure at a wireless transceiver in a building; sending indications of the monitored pressure to a server from the wireless transceiver; receiving a pressure map from the server at the wireless transceiver, the pressure map comprising pressure indications and corresponding indications of regions of the building; and sending the pressure map from the wireless transceiver to a mobile station.

Items and/or techniques described herein may provide one or more of the following capabilities, as well as other capabilities not mentioned. Location disambiguation within a structure may be achieved in the presence of ranging signals from disparate regions in the structure. A mobile station can disambiguate on which floor that the mobile station presently resides in view of ranging signals yielding results indicating different floors as the mobile station's present floor.

BRIEF DESCRIPTIONS OF THE DRAWINGS

DETAILED DESCRIPTION

Figure 1:
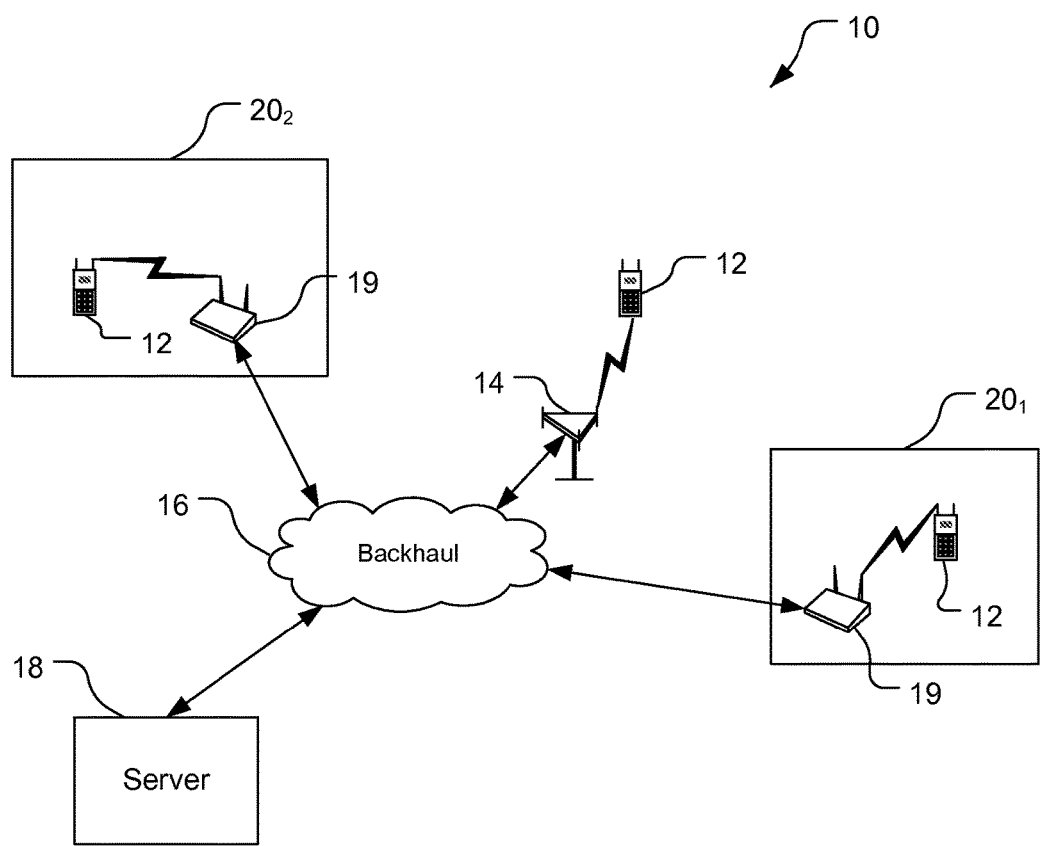
FIG. 1 is a simplified diagram of a communication system.

Techniques are provided for determining location information within a structure, e.g., disambiguating between indoor regions of a building. For example, which floor a mobile device is on in a building can be determined. Pressure information of the building is used to help disambiguate regions. The pressure information may be differential pressure information or absolute pressure information, and may be sent from wireless transceivers (WTs) to MSs (mobile stations), provided in peer-to-peer communications between mobile stations, and/or provided in location assistance data. For example, mobile stations can receive pressure information in location assistance data from a server or other non-WT entity such as from a base station of a wireless communication network, e.g., a cellular telephone network. The pressure information may be obtained by the AP or other entity, including from one or more MSs, and provided to the non-WT entity for transmission to the mobile stations. As another example, WTs can obtain pressure information using pressure sensors of the WTs and send the pressure information to the MSs.

In an example implementation, WTs include pressure sensors. The WTs collect and send absolute pressure information, either in a broadcast message or in a direct, dedicated communication to a specific MS. An MS also includes a pressure sensor, determines absolute pressure, and compares the self-determined pressure to the received pressure from one or more WTs. Signals from multiple WTs of different regions are received, and the MS assigns weights to the received signals based on differentials between the self-determined pressure and the received pressure from each WT, with higher value weights assigned to lower pressure differentials. The region with the highest average weight is determined by the MS to be the region for the MS.

In another example implementation, the WTs send WT pressure differentials, or send absolute pressures and the MS determines the WT pressure differentials. The WT pressure differentials may be of each WT's region relative to one other region, e.g., an entry region to a building (e.g., a ground floor), or to each of multiple other regions of the building (e.g., each of multiple possible entry regions for buildings with multiple entry points on different floors), or to all of the other regions of the building. The MS determines the initial region as the entry region and stores the pressure sensed, using the MS's pressure sensor, when in the initial region as an entry MS pressure. For the case where differentials are relative to an entry region, when the MS moves to a different region, the MS determines an MS pressure differential relative to the entry MS pressure using a present pressure measured by the MS's pressure sensor. The MS compares the determined MS pressure differential with received/calculated AP pressure differential and determines the region using weighting as discussed above. When the MS changes regions again, the MS again determines the MS pressure differential relative to the entry MS pressure and determines the new region. Alternatively, if the WT pressure differentials relative to all the regions are provided/calculated, then the MS can determine the MS pressure differential (difference between the present MS pressure and the previous MS pressure) and compare this MS pressure differential with the WT pressure differentials for the MS's last determined region (i.e., differentials to various regions relative to the MS's last region) to determine the MS's present region, applying weighting of received signals as appropriate.

In other example implementations, the MS receives the pressure information in assistance data from a server or other non-WT entity. As discussed above, the pressure information may be absolute pressure or pressure differential, and if pressure differential, may be relative to a single region, multiple regions, or all regions of a structure.

In another example implementation, MSs broadcast their pressure information and region once they disambiguate their present regions. An MS entering a region (a "new" MS) monitors the broadcasts by other MSs and compares the pressure information received from the MSs with the MS's own determined pressure information to determine the region of the new MS in an appropriate one of the manners discussed above.

Pressure information may be used by MSs to regulate attempts to determine the MSs's locations by disambiguating the region. Disambiguating the region consumes resources and thus is preferably not continuously performed, e.g., only performed in response to a change in LSI or a power-up event. For example, an MS can initiate region disambiguation in response to a significant pressure differential, e.g., exceeding a pressure differential threshold. The threshold is preferably of a value such that a differential exceeding the threshold indicates a likely change in an region. Different thresholds may be used, e.g., depending upon the structure in which the MS presently resides, depending upon the present region of the MS, etc. Further, the threshold may change over time, e.g., depending upon the weather.

Figure 2:
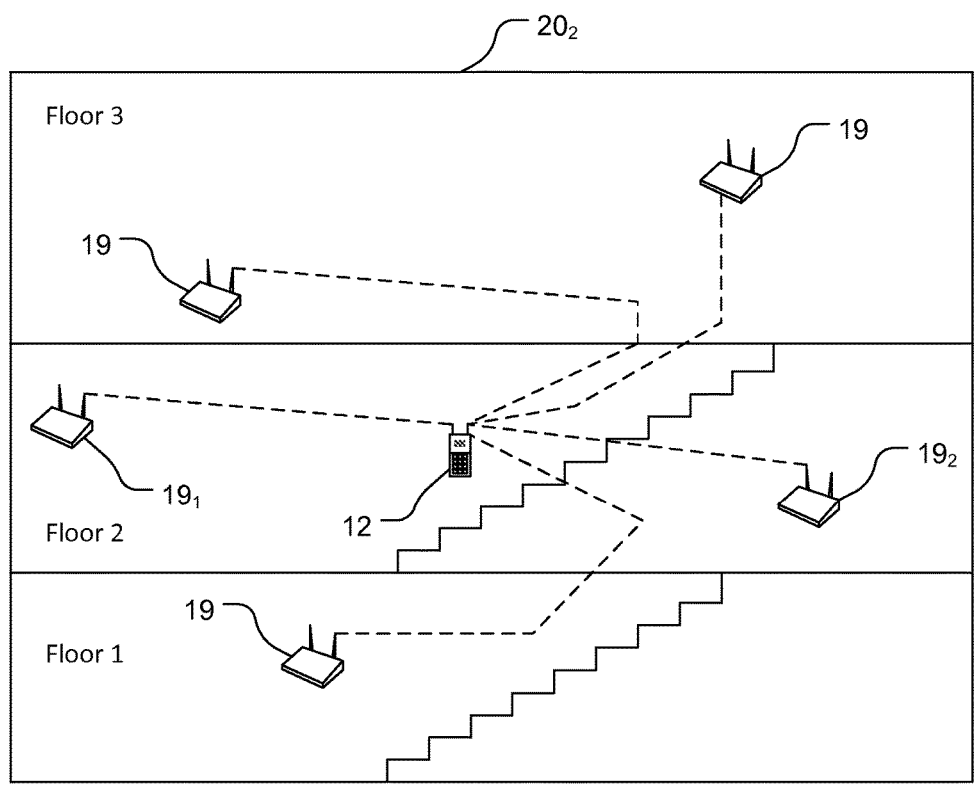
FIG. 2 is a simplified diagram of wireless transceivers and a mobile station in a building shown in FIG. 1.

Referring to FIGS. 1-2, a communication system 10 includes a mobile stations (MSs) 12, a base transceiver station (BTS) 14, a network 16, a server 18, and wireless transceivers (WTs) 19 disposed in buildings 20. The system 10 is a communication system in that the system 10 can at least send and receive communications. Although only one server 18 is shown for simplicity, more than one server 18 may be used in the system 10, e.g., in various locations to provide quicker access as the system 10 may span large regions, e.g., entire countries or continents, or even the planet.

The BTS 14 can wirelessly communicate with the MSs 12 via antennas. Each of the BTSs 14 may also be referred to as an access point, an access node (AN), a Node B, an evolved Node B (Enb), etc. The BTSs 14 are configured to communicate wirelessly with the MSs 12 under the control of the server 18 (via the network 16).

The MSs 12 can be moved to various locations, including into the buildings 20 and onto different floors of the buildings 20. The MSs 12 may be referred to as access terminals (ATs), mobile devices, user equipment (UE), or subscriber units. The MSs 12 are shown here as cellular phones. Other examples of MSs include wireless routers, personal digital assistants (PDAs), netbooks, notebook computers, tablet computers, etc. Only one MS 12 is shown in FIG. 2, and to simplify the discussion below only this MS 12 is discussed.

The server 18 preferably can communicate with the WTs 19 within the buildings 20 through the backhaul. The WTs 19 are preferably hard-wire connected to the network 16.

Figure 3:
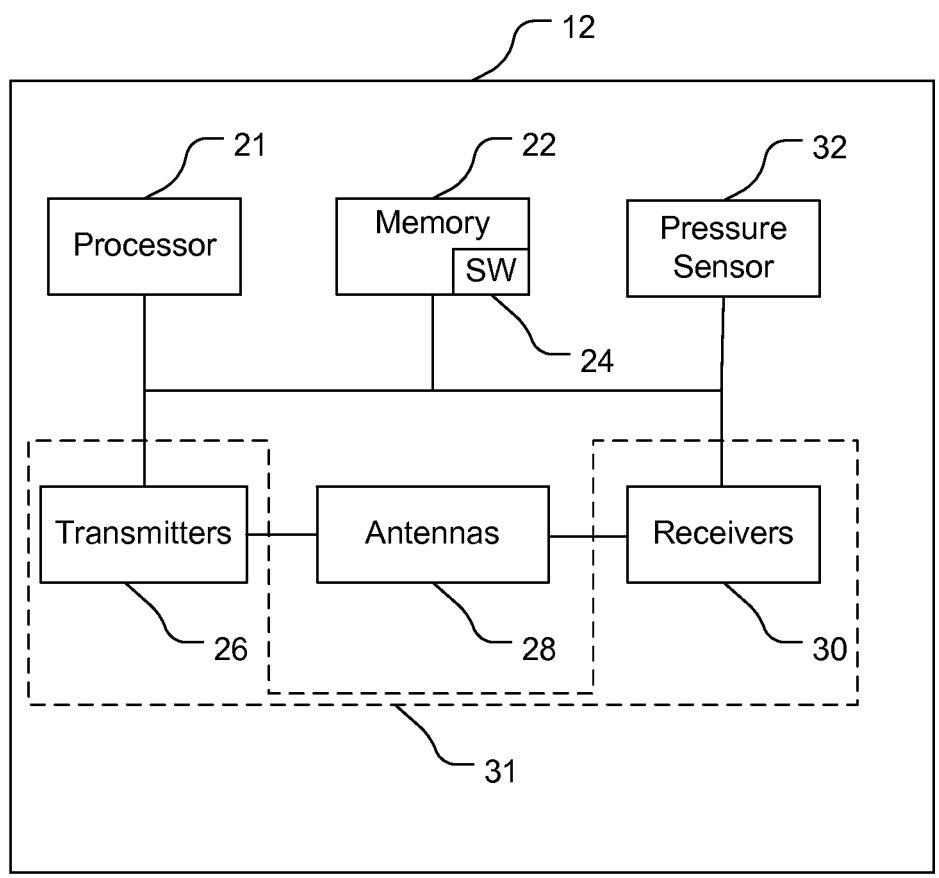
FIGS. 3-6 are block diagrams of the mobile station, a base station, and a server shown in FIG. 1 and one of the wireless transceivers shown in FIG. 2.

Referring to FIG. 3, the MS 12 comprises a computer system including a processor 21, memory 22 including software 24, transmitters 26, antennas 28, receivers 30, and a pressure sensor 32. The transmitters 26, antennas 28, and receivers 30 form a wireless communication module (with the transmitters 26 and receivers 30 being a transceiver 31) that can communicate with the BTS 14 and a wide area network (WAN) and/or a personal area network (PAN) and/or a WiFi node and/or another entity. Other example MSs may have different configurations, e.g., with only one transmitter 26 and/or only one receiver 30, e.g., with only one physical entity capable of implementing its role (receiver, transmitter). The transmitters 26 and receivers 30 are configured to communicate bi-directionally with the BTS 14 and the WTs 19 via the antennas 28. The antennas 28 include a satellite positioning system (SPS) antenna for receiving SPS signals and the receivers 30 include an SPS receiver for processing and transferring the SPS signals to the processor 21. The processor 21 is preferably an intelligent hardware device, e.g., a central processing unit (CPU) such as those made by ARM®, Intel® Corporation, or AMD®, a microcontroller, an application specific integrated circuit (ASIC), etc. The processor 21 could comprise multiple separate physical entities that can be distributed in the MS 12. The memory 22 includes random access memory (RAM) and read-only memory (ROM). The memory 22 stores the software 24 which is computer-readable, computer-executable software code containing instructions that are configured to, when executed, cause the processor 21 to perform various functions described herein (although the description may refer only to the processor 21 performing the functions). Alternatively, the software 24 may not be directly executable by the processor 21 but configured to cause the processor 21, e.g., when compiled and executed, to perform the functions.

Figure 4:
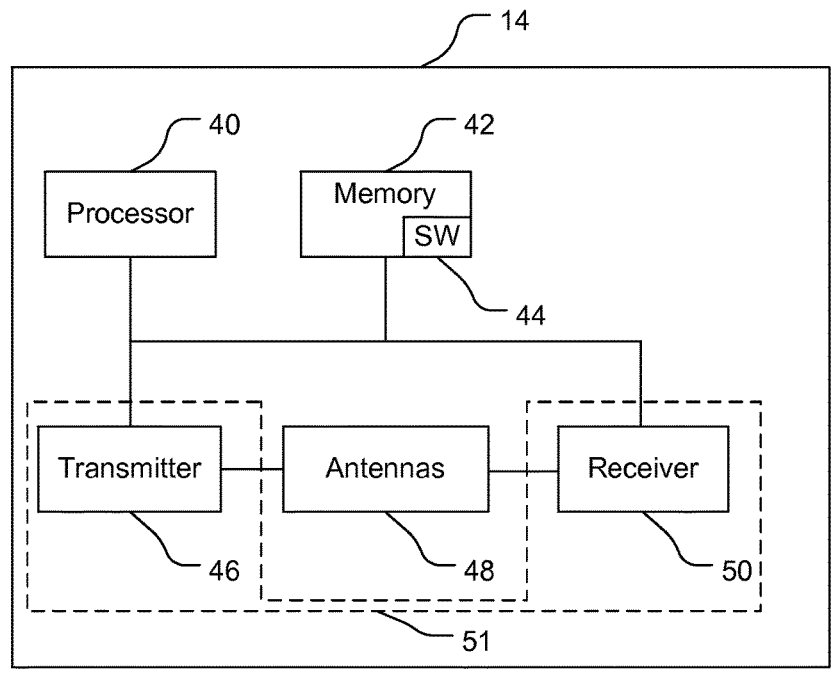

Referring also to FIG. 4, the BTS 14 comprises a computer system including a processor 40, memory 42 including software 44, a transmitter 46, antennas 48, and a receiver 50. While the BTS 14 is shown with a single processor 40 and a single memory 42 (with corresponding software 44), the BTS 14 may have a processor 40 and a memory 42 (with corresponding software 44) for each sector served by the BTS 14, e.g., each of three sectors. The transmitter 46, the antennas 48, and the receiver 50 form a wireless communication module (with the transmitter 46 and the receiver 50 being a transceiver 51) in the BTS 14. The transmitter 46 and the receiver 50 are configured to communicate bi-directionally with the MS 12 via a corresponding antenna 48. The processor 40 is preferably an intelligent hardware device, e.g., a central processing unit (CPU) such as those made by ARM®, Intel® Corporation, or AMD®, a microcontroller, an application specific integrated circuit (ASIC), etc. The processor 40 could comprise multiple separate physical entities that can be distributed in the BTS 14. The memory 42 includes random access memory (RAM) and read-only memory (ROM). The memory 42 stores the software 44, which is computer-readable, computer-executable software code containing instructions that are configured to, when executed, cause the processor 40 to perform various functions described herein (although the description may refer only to the processor 40 performing the functions). Alternatively, the software 44 may not be directly executable by the processor 40, but configured to cause the processor 40, e.g., when compiled and executed, to perform the functions.

The MS 12 and the BTS 14 are configured to communicate with each other. The MS 12 and the BTS 14 can send messages to each other that contain a variety of information. For example, the BTS 14 can collect information from MSs and/or from the server 18 and send a pressure map of regional pressure indications and corresponding region indications to the MS 12 either directly or through one or more of the WTs 19. The regional pressure indications may indicate absolute atmospheric pressures and the region indications may indicate regions corresponding to these pressures. For example, each of the region indications may indicate one of the buildings 20 and a floor number, thus indicating that the corresponding regional pressure is the atmospheric pressure in the specified building 20 on the specified floor. Alternatively, the regional pressure indications may indicate differential atmospheric pressures. The differential pressures may be for each region relative to a single, common region such as the ground floor or the top floor of the building 20. Also or alternatively, the differential pressures may be pressure differentials between each region and multiple other regions (e.g., multiple entrance regions, every other region). Also or alternatively, the differential pressures may include pressure differences between adjacent floors, i.e., between floor n and floor n+1 for n=1 to N−1, where the $N^{th}$ floor is the top floor. The BTS 14 is configured to send the regional pressure indications and corresponding region indications periodically because the absolute pressure changes over time. The BTS 14 may be configured to send differential pressure indications periodically as well. The BTS 14 may be configured to send the regional pressure indications and corresponding region indications in broadcast messages or in a dedicated message as part of an on-going communication with the MS 12 specifically.

Figure 5:
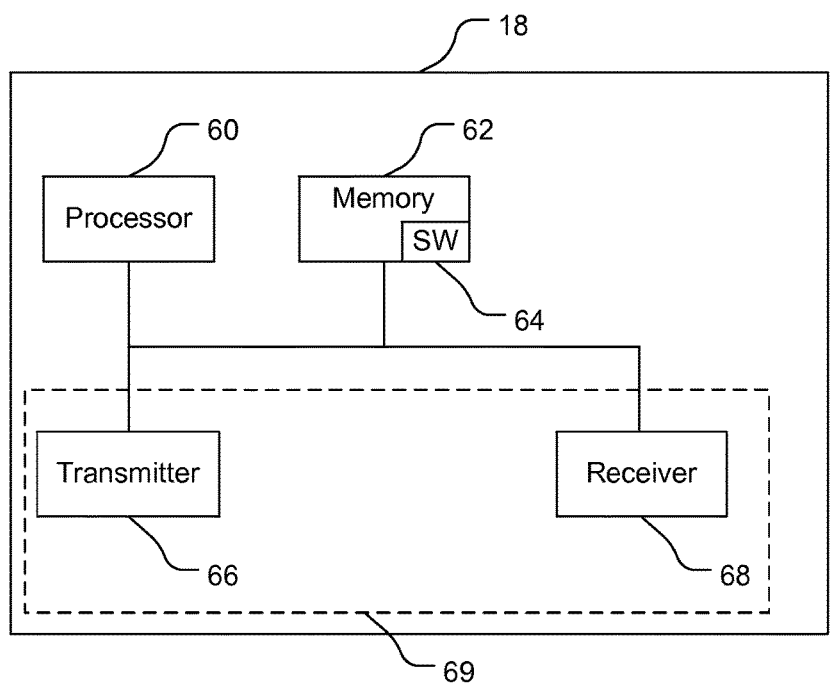

Referring to FIG. 5, the server 18 comprises a computer system including a processor 60, memory 62 including software 64, a transmitter 66, and a receiver 68. The processor 60 is preferably an intelligent hardware device, e.g., a central processing unit (CPU) such as those made by ARM®, Intel® Corporation, or AMD®, a microcontroller, an application specific integrated circuit (ASIC), etc. The processor 60 could comprise multiple separate physical entities that can be distributed in the server 18. The memory 62 includes random access memory (RAM) and read-only memory (ROM). The memory 62 stores the software 64 which is computer-readable, computer-executable software code containing instructions that are configured to, when executed, cause the processor 60 to perform various functions described herein (although the description may refer only to the processor 60 performing the functions). Alternatively, the software 64 may not be directly executable by the processor 60 but configured to cause the processor 60, e.g., when compiled and executed, to perform the functions. The transmitter 66 and the receiver 68 (together a transceiver 69) are configured to send communications to and receive communications from the BTS 14 through wired connections via the network 16.

Figure 6:
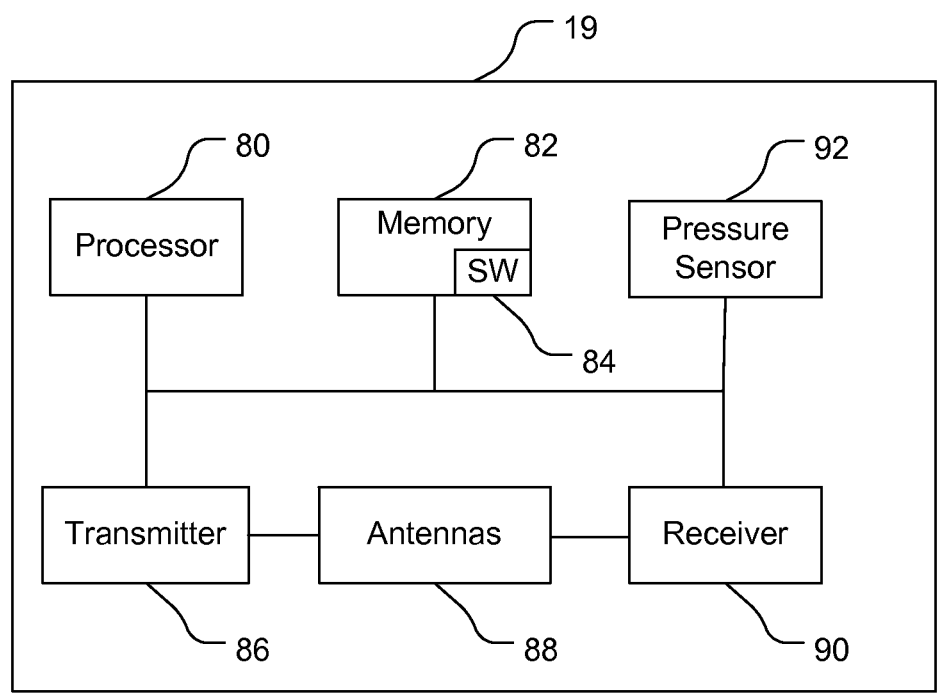

Referring to FIG. 6, an example of one of the WTs 19 comprises a computer system including a processor 80, memory 82 including software 84, a transmitter 86, antennas 88, a receiver 90, and a pressure sensor 92. The transmitter 86, antennas 88, and the receiver 90 form a wireless communication module (with the transmitter 86 and the receiver 90 being a transceiver). The transmitter 86 is connected to one of the antennas 88 and the receiver 90 is connected to another of the antennas 88. Other example WTs may have different configurations, e.g., with only one antenna 88, and/or with multiple transmitters 86 and/or multiple receivers 90. The transmitter 86 and the receiver 90 are configured such that the WT 19 can communicate bi-directionally with the MS 12 via the antennas 88. The processor 80 is preferably an intelligent hardware device, e.g., a central processing unit (CPU) such as those made by ARM®, Intel® Corporation, or AMD®, a microcontroller, an application specific integrated circuit (ASIC), etc. The processor 80 could comprise multiple separate physical entities that can be distributed in the WT 19. The memory 82 includes random access memory (RAM) and read-only memory (ROM). The memory 82 stores the software 84 which is computer-readable, computer-executable software code containing instructions that are configured to, when executed, cause the processor 80 to perform various functions described herein (although the description may refer only to the processor 80 performing the functions). Alternatively, the software 84 may not be directly executable by the processor 80 but configured to cause the processor 80, e.g., when compiled and executed, to perform the functions.

The pressure sensor 92 is configured to measure atmospheric pressure at the WT 19 and to provide an indication of the pressure to the processor 80. The processor 80 (per the software 84) is configured to repeatedly (e.g., periodically at set times and/or intervals that may be constant or varying) request an updated pressure indication from the pressure sensor 92. The pressure sensor 92 will respond to the request from the processor 80 by sensing the pressure and providing an indication of the pressure to the processor 80 which may store the indication in the memory 82.

The processor 80 is configured to transmit indications of the pressure at the WT 19 and an indication of the location of the WT 19. The processor 80 can broadcast a message and/or send a dedicated message that includes an indication of the atmospheric pressure at the WT 19 (preferably the most recently determined pressure sensed by the pressure sensor 92) and an indication of the region of the WT 19, e.g., a floor number, a combination of a building identification and a floor number, or other location identifier (e.g., a portion of a floor).

The transmitter 86 and the receiver 90 are further configured such that the WT 19 can communicate bi-directionally with the server 18 through the network 16 via a wired connection. The WT 19 can receive pressure maps from the server 18 and store the pressure maps in the memory 82.

Figure 7:
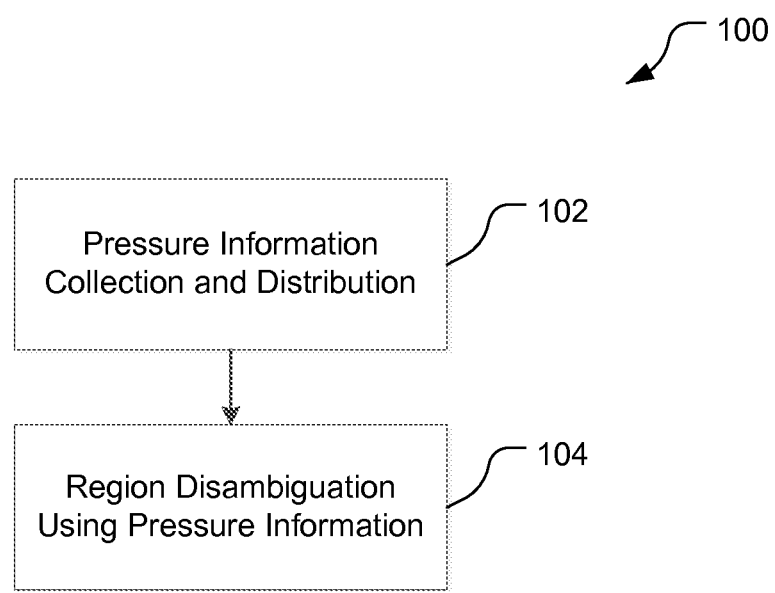
FIG. 7 is a block flow diagram of a process of obtaining and using pressure information to disambiguate mobile station location.

Referring to FIG. 7, a process 100 of obtaining and using pressure information to determine mobile station location includes the stages shown. At stage 102, pressure information is collected and distributed to the MSs 12. The pressure information can be absolute pressure and/or pressure differentials. The information can be collected into a pressure map, of pressures and locations of the WTs 19, that is distributed to the MSs 12, or each of the WTs 19 can send the absolute or differential pressure pertaining to that WT 19 to the MSs 12. Examples of this stage are discussed with respect to FIGS. 8-9 below. At stage 104, the pressure information is used to disambiguate MS location between multiple possible regions. Examples of this stage are discussed with respect to FIGS. 10-12.

Figures 8A, 8B:
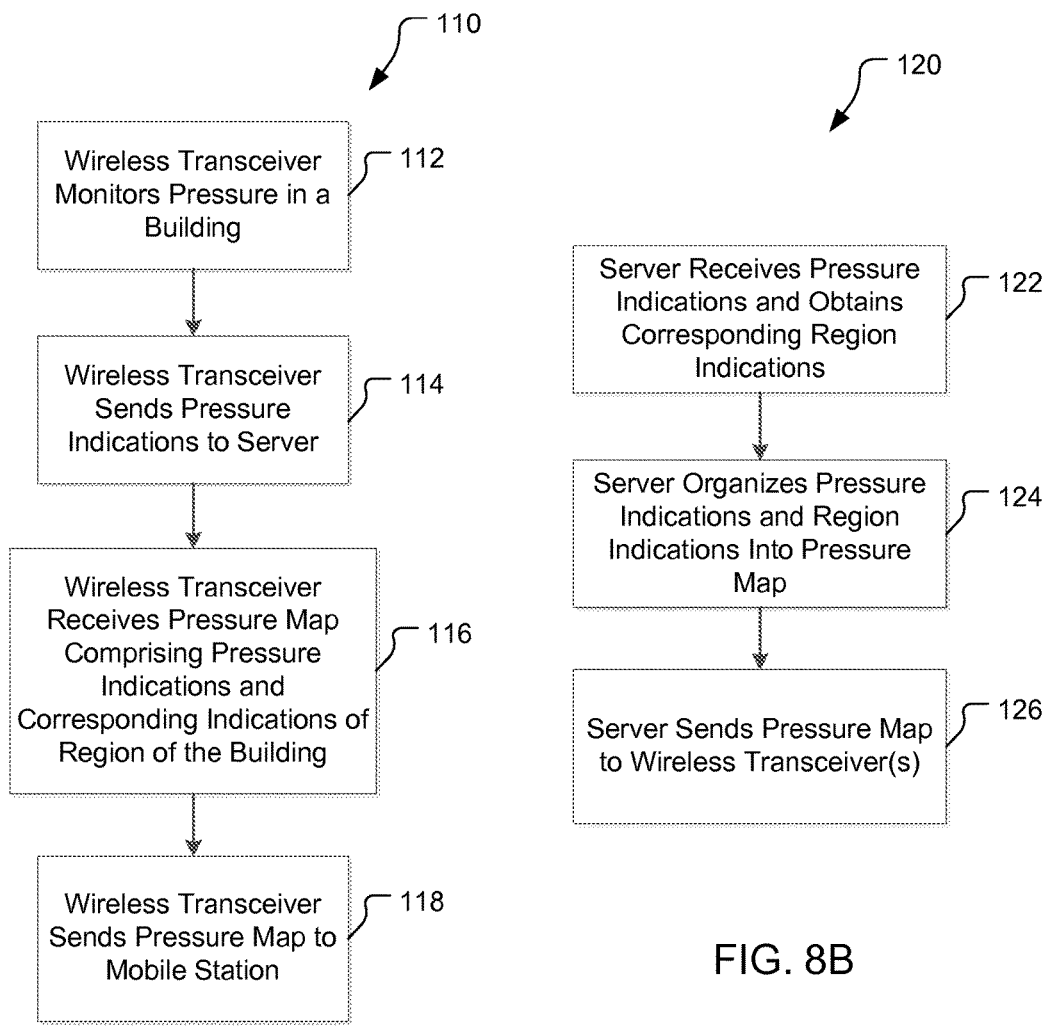
FIG. 8A is a block flow diagram of a process of collecting and sending pressure information for generation of a pressure map for a structure, and receiving and distributing the pressure map.
FIG. 8B is a block flow diagram of a process of centralized collecting of pressure indications, and generating and providing a pressure map.

Referring to FIG. 8A, with further reference to FIGS. 1-2 and 6, a process 110 of collecting and sending pressure information, and receiving and distributing a pressure map includes the stages shown. The process 110 is, however, an example only and not limiting. The process 110 can be altered, e.g., by having stages altered, added, removed, rearranged, combined, and/or performed concurrently. While the process 110 is performed by multiple WTs 19, for simplicity, the process 110 discusses a single one of the WTs 19.

At stage 112, the WT 19 monitors pressure information. Here, the WT 19 is in the structure 20₂. The WT 19 measures the pressure using the pressure sensor 92. Measurements are taken over time to account for changes affecting the pressure readings, e.g., weather, changes to the building (e.g., addition/removal of a vent, activation/deactivation of air conditioning), movement of the WT 19, etc. The WT may periodically measure the pressure, and/or may measure the pressure in response to a request, e.g., from the server 18 and/or an MS 12. The WT 19, e.g., the processor 80, may use the measured pressure to determine a differential pressure relative to a reference.

At stage 114, the WT 19 sends the pressure measured. The WT 19 can report the pressure to the MSs 12 wirelessly and to the server 18 via the network 16. Alternatively, the pressure readings can be reported to the server 18 from an MS 12 through a base station 14 and the network 16 and/or through the WT 19 and the network 16.

Along with the pressure readings, the WT 19 provides region information from which the WT's location (region in the structure 20₂) can be determined, e.g., with each pressure reading. For example, the pressure reading may be accompanied by an indication of the WT's location or information associated with the WT 19 (e.g., a network address such as a MAC address) that can be used to determine the WT's location (e.g., by looking up the MAC address in a table of MAC addresses and corresponding locations).

At stage 116, the WT 19 receives a pressure map of pressure indications and corresponding region indications. The generation of the pressure map is discussed below with respect to FIG. 8B.

At stage 118, the pressure map is sent to the MS 12, which receives the pressure map. The WT 19 sends the pressure map to the MS 12, e.g., when the MS 12 enters the building 20₂, or when the MS 12 is activated while in the building 20₂. Alternatively, the server 18 may send the pressure map to the MS 12 through the network 16 and the BTS 14, or directly to the MS 12 if the server 18 is configured for wireless communication. In these cases, the server 18 preferably sends the pressure map for each structure near the MS 12 (e.g., within a cell served by the BTS 14) or that the server 18 otherwise knows the MS 12 is likely to enter (e.g., if a calendar on the MS 12 indicates an imminent meeting in a particular building). The pressure map is included in assistance data sent to the MS 12.

Referring to FIG. 8B, with further reference to FIGS. 1-2 and 6, a process 120 of centralized collecting of pressure indications, and generating and providing a pressure map, includes the stages shown. The process 120 is, however, an example only and not limiting. The process 120 can be altered, e.g., by having stages altered, added, removed, rearranged, combined, and/or performed concurrently. For example, stage 126 discussed below may be omitted.

At stage 122, the server 18 receives the reported pressures and obtains corresponding region indications. The server 18 receives the pressure indications from the WTs 19. The server 18 also obtains region indications corresponding to the pressure indications, e.g., by analyzing communications from the WTs 19 with the pressure indications. The processor 60 of the server 18 extracts region indications from the communications from the WTs 19, or uses information from the communications (e.g., MAC address and a mapping of MAC addresses and locations) to determine the region indications corresponding to the pressure indications.

At stage 124, the server organizes the pressure indications and corresponding region indications into a pressure map. In cases where the WTs 19 provide explicit region indications to the server 18, the region indications in the pressure map may or may not be identical to the region indications provided by the WTs 19 to the server 18. The pressure map information may be added to a heat map indicating signal strength at locations within a building or may be used as its own map indicating pressure at locations within the building. The processor 80 can organize and store the pressure/region information in the memory 82 in one or more of a variety of ways. For example, referring also to Table 1, the processor 80 stores a pressure-region table for the building $20_2$ with indications of absolute pressure and corresponding region.

TABLE 1

Absolute Pressure and Region Indications for Building $20_2$

| Region/Floor | Regional Pressure (in Hg) |
| --- | --- |
| 1 | 29.5360 |
| 2a | 29.5264 |
| 2b | 29.5256 |
| 3 | 29.5152 |

In this example, the absolute pressure for each region is provided in units of inches of mercury, but other units of pressure could be used, e.g., Torr, mm Hg, Pa, kPa, bar, or psi. As the pressure value will vary over time, e.g., due to variations in weather, Table 1 is updated, e.g., periodically such as every 10 minutes or as new measurements are received from the WTs 19. Further, in this example, there are multiple regions on the second floor and the regions have different pressure, e.g., because of differences in the readings from multiple pressure sensors 92 of the WTs 19 and/or because different WTs 19 may be at different heights, e.g., the WTs $19_1$, $19_2$ shown in FIG. 2 on floor 2. In this case, the server 18 may combine, e.g., average, the pressure indications of a single floor to produce a single value for each floor.

As another example, with reference to Table 2, the processor 80 may store a pressure-region table for the building $20_2$ with indications of differential pressure and corresponding region.

TABLE 2

Differential Pressure and Region Indications for Building $20_2$

| Region/Floor | Differential Pressure (in Hg) | Reference Region |
| --- | --- | --- |
| 1 | 0 | 1 |
| 1 | 0.0096 | 2a |
| 1 | 0.0104 | 2b |
| 1 | 0.0208 | 3 |
| 2a | −0.0096 | 1 |
| 2a | 0 | 2a |
| 2a | 0.0008 | 2b |
| 2a | 0.0112 | 3 |
| 2b | −0.0104 | 1 |
| 2b | −0.0008 | 2a |
| 2b | 0 | 2b |
| 2b | 0.0104 | 3 |
| 3 | −0.0208 | 1 |
| 3 | −0.0112 | 2a |
| 3 | −0.0104 | 2b |
| 3 | 0 | 3 |

Pressure differentials for each region relative to all regions (the reference regions) are calculated by the processor 80 from the absolute pressure readings provided by the WTs 19. As shown, the processor 80 stores each differential in association with an indication of the reference region, and in association with an indication of the region at which that differential exists. Alternatively, differentials could be provided for each region relative to only entrance regions of the building 20.

As another example, with reference to Table 3, the processor 80 may store a pressure-region table for the building $20_2$ with indications of differential pressures between adjacent regions.

TABLE 3

Differential Pressures For Adjacent Regions and Region Indications for Building $20_2$

| Region/Floor | Differential Pressure (in Hg) | Reference Region |
| --- | --- | --- |
| 1 | 0.0096 | 2a |
| 1 | 0.0104 | 2b |
| 2a | −0.0096 | 1 |
| 2a | 0.0008 | 2b |
| 2a | 0.0112 | 3 |
| 2b | −0.0104 | 1 |
| 2b | −0.0008 | 2a |
| 2b | 0.0104 | 3 |
| 3 | −0.0112 | 2a |
| 3 | −0.0104 | 2b |

Thus, only differentials for adjacent floors, or split-level floors, are stored. If a differential pressure relative to a non-adjacent floor is needed, then the differentials between the two floors are added (e.g., for the differential between floor 1 and floor 3, the differential from floor 1 to floor 2a (or 2b) is added to the differential from floor 2a (or 2b) to floor 3).

At stage 126, the server 18 sends the pressure map information to the WTs 19. Preferably, the server 18 sends the pressure map, e.g., Table 1, 2, or 3, to all of the WTs 19 in the building to which the pressure map applies. Alternatively, the server 18 could send the pressure map only to the entrance WTs 19 (i.e., each of the WTs 19 near an entrance). The server 18 sends the pressure map information to the WTs 19 through the network 16.

Figure 9:
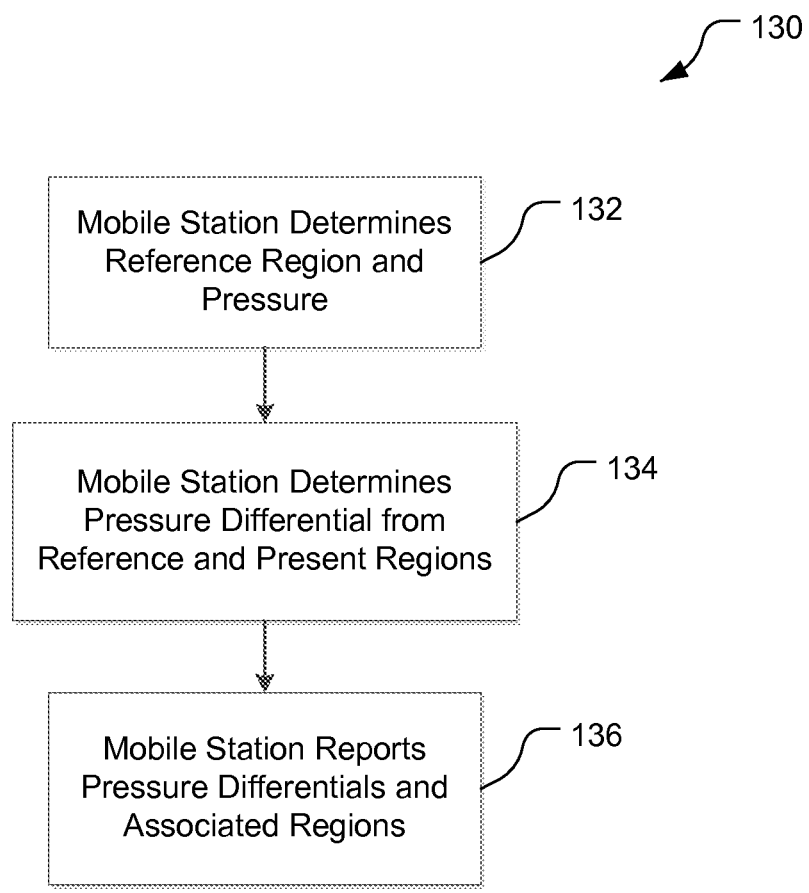
FIG. 9 is a block flow diagram of a process of crowd-sourced collecting of pressure information associated with structures.

Referring to FIG. 9, with further reference to FIGS. 1-2 and 6, a process 130 of crowd-sourced collecting of pressure information associated with the structure $20_2$ includes the stages shown. The process 130 is, however, an example only and not limiting. The process 130 can be altered, e.g., by having stages altered, added, removed, rearranged, combined, and/or performed concurrently.

At stage 132, the MS 12 determines its location and pressure at that location. The processor 21 determines the region of the building 20 in which the MS 12 currently resides using standard techniques (e.g., received signal strength indicators (RSSIs) of AP signals, round trip time (RTT) of a communication with an AP). The processor 21 stores the determined region in the memory 22 as a reference region. The pressure sensor 32 measures the pressure at the MS 12 and the processor 21 stores the measured pressure in association with the reference region. If the present region is ambiguous, e.g., there are similar RSSI and/or RTT results for WTs 19 in different regions, then the region can be disambiguated as discussed below with respect to FIG. 11 using absolute pressure and/or as discussed below with respect to FIG. 12 using pressure differentials.

At stage 134, the MS 12 determines the MS's present region and a pressure differential between the MS's present region and the reference region. The MS 12 repeatedly (e.g., periodically) determines the present pressure using the pressure sensor 32. The sensor 32 could be repeatedly activated to measure the pressure or the sensor 32 could be active and the pressure measurements repeatedly sampled. The processor 21 determines a pressure differential between the present pressure and the reference pressure and stores the pressure differential in the memory 22. Similar to stage 132, the MS 12 also determines the present region of the MS 12 and stores an indication of the present location in association with the pressure differential corresponding to that region.

At stage 136, the MS 12 reports the pressure differentials and associated regions. The MS 12 reports the differentials and associated regions to the server 18 and the server 18 organizes the pressure information into one or more pressure maps and sends the pressure map(s) to the MSs 12 as discussed with respect to stages 114, 116, 118 of FIG. 8. Also or alternatively, the MS 12 could report the pressure information to other MSs 12 and the MSs 12 can organize the pressure information as discussed with respect to stage 114 of FIG. 8.

Figure 10:
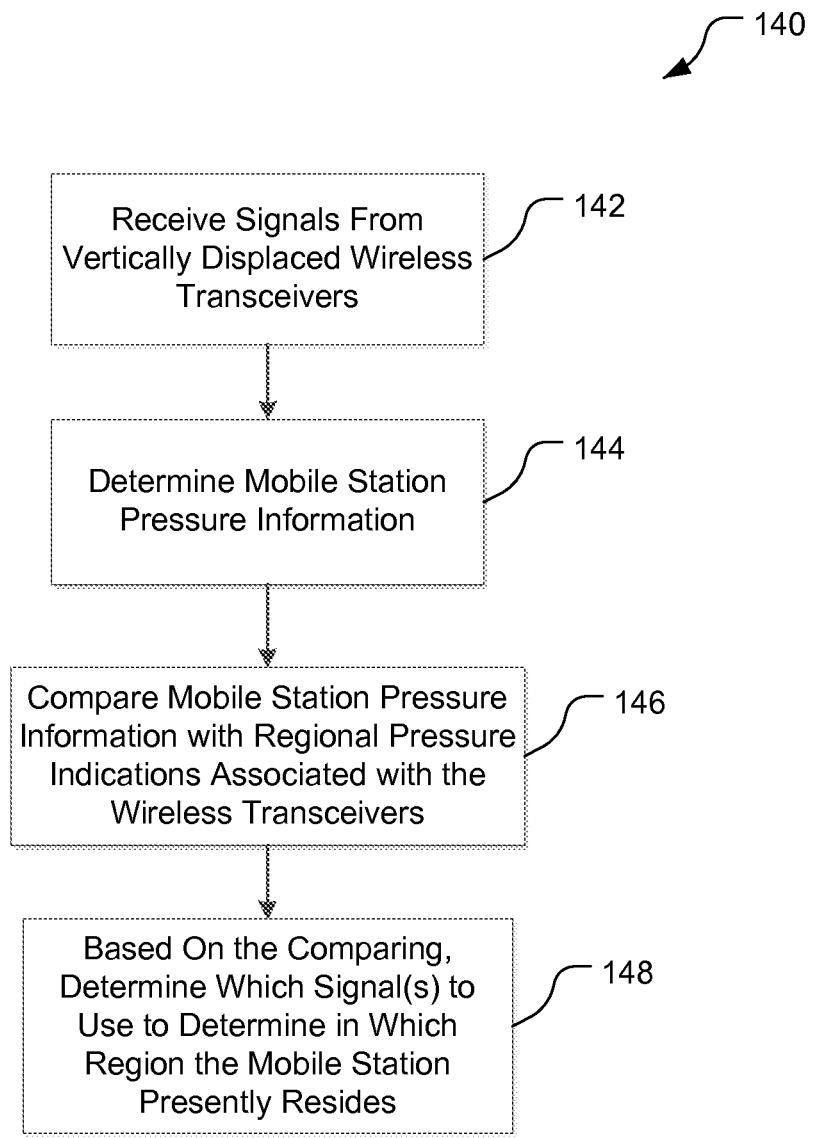
FIG. 10 is a block flow diagram of a process of disambiguating a location of the mobile station shown in FIG. 2.

Referring to FIG. 10, with further reference to FIGS. 1-6, a process 140 of disambiguating a location of the mobile station 12 within the structure $20_2$ includes the stages shown. The process 140 is, however, an example only and not limiting. The process 140 can be altered, e.g., by having stages altered, added, removed, rearranged, combined, and/or performed concurrently. The process 140 uses absolute pressure indications and measurements to determine the location information.

At stage 142, the mobile station 12 receives signals from vertically displaced WTs 19. The MS 12 determines that the MS 12 should not use the signals from both of the WTs 19 to determine the region of the MS 12, e.g., because the WTs 19 are on different floors or split-level floors and thus using the signals from each of the WTs 19 would yield determined regions that are incompatibly different (i.e., both cannot be right), e.g., determined regions on different floors or split-level floors. The received signals may include indications of absolute pressures at the WTs 19, differential pressures at the WTs 19, and/or indications of the regions of the WTs 19.

At stage 144, the MS 12 determines MS pressure information. The pressure sensor 32 measures the pressure at the MS 12 and the processor 21 stores MS pressure information as the pressure measured by the sensor 32 and/or a differential between the pressure measured by the sensor 32 and a reference pressure as computed by the processor 21.

At stage 146, the MS compares the MS pressure information with regional pressure indications associated with the WTs 19. For cases where absolute pressure without a pressure map is used, the MS 12 compares the MS pressure with the absolute pressures provided by the WTs 19. For cases where absolute pressure with a pressure map is used, the MS 12 compares the MS pressure with the absolute pressures indicated in the pressure map. For cases where differential pressure without a pressure map is used, the MS 12 determines an MS differential pressure (difference between the MS pressure and a reference pressure associated with a reference region) and compares the MS differential pressure with the differential pressures, corresponding to the reference region, provided by the WTs 19. For cases where differential pressure with a pressure map is used, the MS 12 compares the MS differential pressure with the differential pressures indicated in the pressure map for the reference region.

At stage 148, based on the comparing in stage 146, the MS 12 determines which signal(s) to use to determine in which region the MS 12 presently resides. For the absolute pressure with no map case, the MS 12 may use the AP pressure(s), indicated in the AP signal(s), that is(are) close to the MS pressure, e.g., within a threshold of the MS pressure. For example, if only one AP pressure is within the threshold, then the region associated with that signal is determined to be the MS's region. Also or alternatively, the MS 12 may assign weights to signals based on the closeness of the AP pressure to the MS pressure, and may determine as the MS's present region the region associated with the highest weight region, e.g., with weights of signals from the same floor summed where the region is a floor. For the absolute pressure with a pressure map case, the MS 12 uses the AP pressure provided in the map corresponding to the location(s) indicated by the received signal(s) and determines the region similarly to the no map case. For the differential pressure no map case, the MS 12 may use the AP differential pressure(s), indicated in the AP signal(s), that is(are) close to the MS differential pressure, e.g., within a threshold of the MS differential pressure, and/or weights the AP differential pressures to determine the MS's region. For the differential pressure with a pressure map case, the MS 12 uses the AP differential pressure provided in the map corresponding to the location(s) indicated by the received signal(s) and determines the region similarly to the no map case. The MS 12 can make the decision whether to use the signal(s) at various times, e.g., before using any of the AP signals to determine the MS's region, or after determining the MS's region (s) using multiple ones (e.g., all) of the available AP signals. Thus, the decision whether to use the signal may be a decision whether to use the signal to determine an region, or a decision after the region is determined whether to use this region that was determined using the signal.

Figure 11:
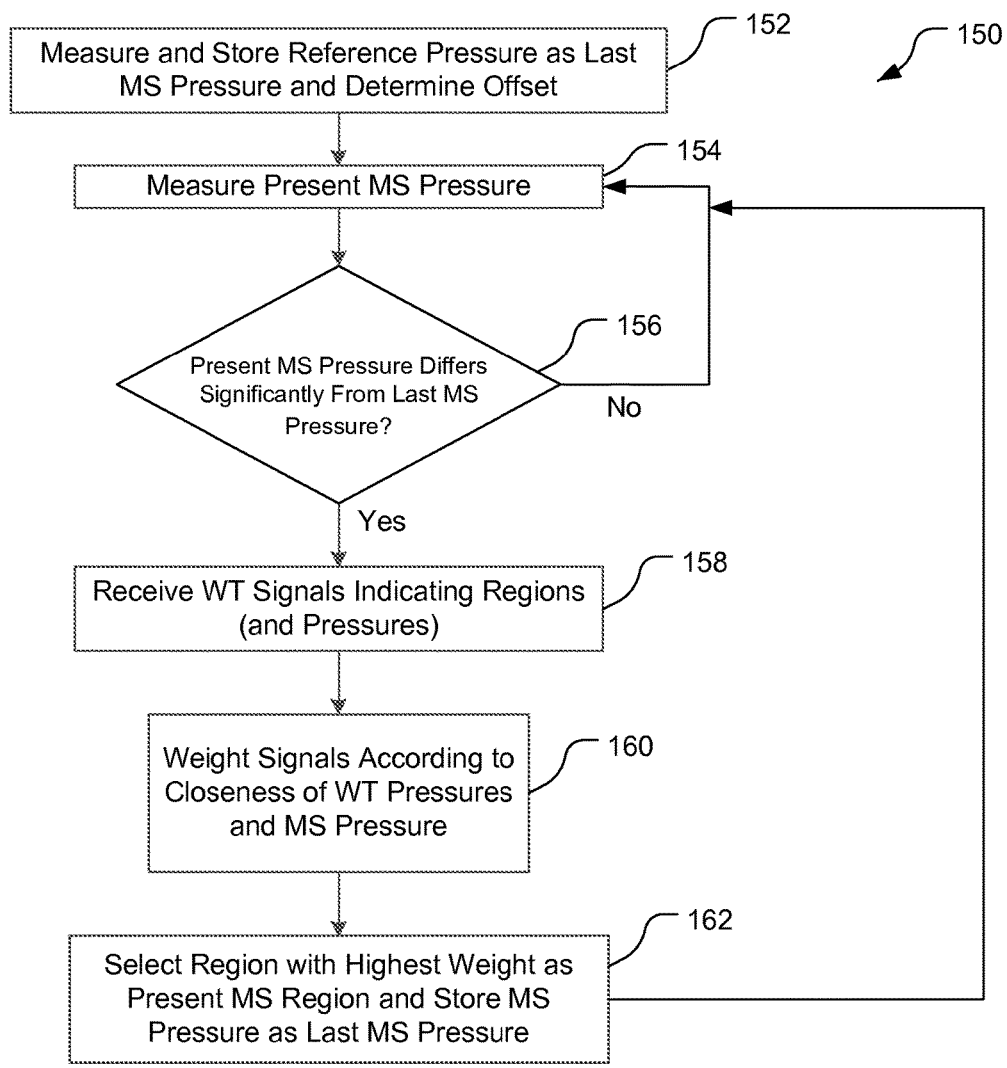
FIG. 11 is a block flow diagram of a process of disambiguating, using absolute pressure indications and measurements, the location of the mobile station shown in FIG. 2.

Referring to FIG. 11, with further reference to FIGS. 1-6, a process 150 of disambiguating, using absolute pressure indications and measurements, the region of the MS 12 within the structure $20_2$ includes the stages shown. The process 150 is, however, an example only and not limiting. The process 150 can be altered, e.g., by having stages altered, added, removed, rearranged, combined, and/or performed concurrently. For example, stages 152 and 156 may be eliminated, and stage 162 modified not to store the MS pressure as a last MS pressure if region determination is performed even in the absence of significant MS pressure change.

At stage 152, the MS 12 measures and stores a reference pressure as a last MS pressure and determines a pressure offset. The pressure sensor 32 measures an MS pressure at or near an entrance to the building 20, or at the MS's location in the building in response to the pressure sensor 32 and/or other components of the MS 12 becoming active, e.g., in response to the MS 12 being turned on. The processor 21 stores the AP pressure in the memory 22 as the last MS pressure. The MS 12 preferably receives an indication of the absolute pressure of the MS's location as determined by the pressure sensor 92 of an WT 19, i.e., the AP pressure which in this instance is an absolute pressure. This indication may be received from the WT 19 itself, or may be in a pressure map received by the MS 12. In the map case, the MS 12 determines the present region of the MS 12 and determines the AP pressure as the pressure associated with the MS's present region in the map. The MS 12 determines a pressure offset as a difference between the AP pressure and the MS pressure and adjusts future MS pressure measurements by this offset. This offset may be reset, e.g., periodically, each time the MS 12 enters a new building, each time the pressure sensor is deactivated and reactivated, etc.

At stage 154, the MS 12 measures a present MS pressure. The pressure sensor 32 measures the present MS pressure, e.g., periodically.

At stage 156, an inquiry is made as to whether the present MS pressure differs significantly from the last MS pressure. The inquiry is to determine whether it is likely that the MS 12 has changed regions, e.g., changed floors. For example, the processor 21 determines whether the present MS pressure differs from the last MS pressure by more than a threshold amount. The threshold amount may be pressure-map dependent, e.g., requiring different thresholds based on location, e.g., due to known pressure variations. Further, some present MS pressures may be ignored based on the location, e.g., in known variable pressure or pressure anomaly locations, or in locations not near an region transition such as a stairwell. If the present and last MS pressures are not significantly different, indicating that a change in region is unlikely, then the process 150 returns to stage 154. If the present and last MS pressures are significantly different, indicating that a change in region is likely, then region determination is triggered and the process 150 proceeds to stage 158.

At stage 158, the MS 12 receives AP signals from multiple regions, with the signals indicating the regions of the corresponding WTs 19 and possibly indicating the corresponding AP pressures. If a pressure map is being used, then the AP signals may not indicate the AP pressures of the WTs 19.

At stage 160, the AP signals are weighted according to closeness of the AP pressures to the MS pressure. The processor 21 determines differences between AP pressure (either indicated in the AP signals or determined from locations indicated in the AP signals and the pressure map) and the present MS pressure and assigns weights to the signals, with higher weights being assigned to signals with smaller differences. For multiple AP signals with the same region (e.g., floor), the weights are summed.

At stage 162, the region with the highest weight is selected as the present MS region and the present MS pressure is stored as the last MS pressure. The processor 21 disambiguates the region of the MS 12 based on the AP signals from the different regions by either disregarding the received AP signals from the non-selected region before determining the MS's region or by disregarding the non-selected region results after determining the MS's region using each of the AP signals received. The process 150 returns to stage 154.

Figure 12:
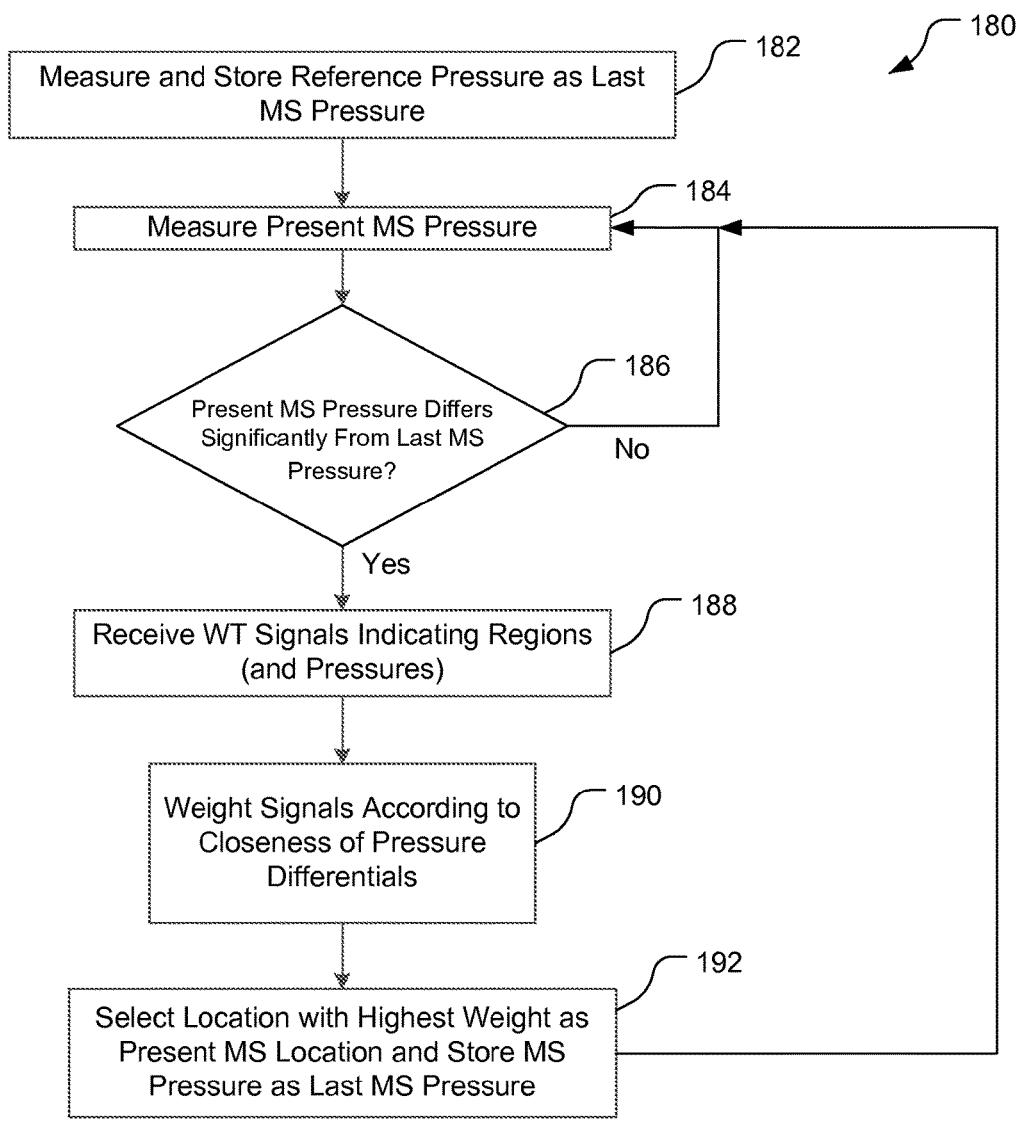
FIG. 12 is a block flow diagram of a process of disambiguating, using differential pressure indications and measurements, the location of the mobile station shown in FIG. 2.

Referring to FIG. 12, with further reference to FIGS. 1-6, a process 180 of disambiguating, using differential pressure indications and measurements, the region of the MS 12 within the structure $20_2$ includes the stages shown. The process 180 is, however, an example only and not limiting. The process 180 can be altered, e.g., by having stages altered, added, removed, rearranged, combined, and/or performed concurrently. For example, stages 182 and 186 may be eliminated, and stage 192 modified not to store the MS pressure as a last MS pressure if region determination is performed even in the absence of significant MS pressure change.

At stage 182, the MS 12 measures and stores a reference pressure as a last MS pressure and determines a pressure offset. The pressure sensor 32 measures an MS pressure at or near an entrance to the building 20, or at the MS's location in the building in response to the pressure sensor 32 and/or other components of the MS 12 becoming active, e.g., in response to the MS 12 being turned on. The processor 21 stores the AP pressure in the memory 22 as the last MS pressure, and this first AP pressure as a reference pressure. The MS 12 determines the present region of the MS 12 using standard techniques. If multiple AP signals require region disambiguation, then the MS 12 preferably waits until there is no region ambiguity.

At stage 184, the MS 12 measures a present MS pressure. The pressure sensor 32 measures the present MS pressure, e.g., periodically.

At stage 186, an inquiry is made as to whether the present MS pressure differs significantly from the last MS pressure. The inquiry is to determine whether it is likely that the MS 12 has changed regions, e.g., changed floors. For example, the processor 21 determines whether the present MS pressure differs from the last MS pressure by more than a threshold amount. The threshold amount may be pressure-map dependent, e.g., requiring different thresholds based on location, e.g., due to known pressure variations. Further, some present MS pressures may be ignored based on the location, e.g., in known variable pressure or pressure anomaly locations, or in locations not near an region transition such as a stairwell. If the present and last MS pressures are not significantly different, indicating that a change in region is unlikely, then the process 180 returns to stage 184. If the present and last MS pressures are significantly different, indicating that a change in region is likely, then region determination is triggered and the processor 21 determines an MS differential pressure between the present MS pressure and the reference MS pressure and the process 180 proceeds to stage 188.

At stage 188, the MS 12 receives AP signals from multiple regions, with the signals indicating the regions of the corresponding WTs 19 and possibly indicating the corresponding AP pressures. If a pressure map is being used, then the AP signals may not indicate the AP differential pressures of the WTs 19.

At stage 190, the AP signals are weighted according to closeness of the AP differential pressures to the MS differential pressure. The processor 21 determines differences between AP differential pressure (either indicated in the AP signals or determined from locations indicated in the AP signals and the pressure map) and the present MS differential pressure and assigns weights to the signals, with higher weights being assigned to signals with smaller differences. For multiple AP signals with the same region (e.g., floor), the weights are summed.

At stage 192, the region with the highest weight is selected as the present MS region and the present MS pressure is stored as the last MS pressure. The processor 21 disambiguates the region of the MS 12 based on the AP signals from the different regions by either disregarding the received AP signals from the non-selected region before determining the MS's region or by disregarding the non-selected region results after determining the MS's region using each of the AP signals received. The process 180 returns to stage 184.

Other Considerations

One or more dedicated devices may be provided that measure pressure and send communications indicating the pressures, and information from which the region can be determined, to the server 18 and/or the MSs 12.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on"

an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method of disambiguating a location of a mobile station within a structure, the method comprising:
   measuring a first pressure at the mobile station at a first location within the structure;
   measuring a second pressure at the mobile station at a second location within the structure;
   determining a pressure differential threshold based on the first location within the structure, the pressure differential threshold being indicative of a pressure difference between adjacent vertically displaced floors within the structure, or a substantial portion thereof;
   determining, based on the second location relative to a floor transition within the structure, that a pressure differential between the first pressure and the second pressure exceeds the pressure differential threshold; and
   in response to the determining that the pressure differential between the first pressure and the second pressure exceeds the pressure differential threshold, disambiguating the location of the mobile station.

2. The method of claim 1 wherein the disambiguating the location of the mobile station comprises:
   obtaining, at the mobile station, signals from a plurality of access points, the signals comprising a plurality of regional pressure indications and corresponding region indications indicating a plurality of regions within the structure that are vertically displaced with respect to each other, each of the plurality of regional pressure indications indicating atmospheric pressure information associated with a corresponding one of the plurality of regions;
   comparing at least one of the pressure differential or the second pressure with the plurality of regional pressure indications; and
   determining in which of the plurality of regions within the structure the mobile station presently resides based on the comparing.

3. The method of claim 2 wherein the plurality of regional pressure indications are pressure differential indications and the comparing compares the pressure differential with the plurality of regional pressure indications.

4. The method of claim 2 wherein the obtaining comprises receiving the plurality of regional pressure indications from an entity external to the structure as part of location assistance data.

5. The method of claim 2 wherein the obtaining comprises receiving at least some of the plurality of regional pressure indications and the corresponding region indications via peer-to-peer communications from other mobile stations.

6. The method of claim 1 wherein the pressure differential threshold changes based on weather.

7. The method of claim 2 wherein the obtaining comprises:
receiving each of the plurality of regional pressure indications from a different wireless transceiver disposed in the structure.

8. The method of claim 1 further comprising determining the pressure differential threshold based on a pressure-map for the structure.

9. The method of claim 1 wherein the pressure differential threshold changes over time.

10. The method of claim 1, further comprising:
in response to disambiguating the location of the mobile station, broadcasting pressure information and region information associated with the location of the mobile station.

11. The method of claim 1, further comprising:
receiving wireless signals from a plurality of wireless devices associated with the determined floor; and
determining, based on the wireless signals, a location on the determined floor as the location of the mobile station within the structure.

12. The method of claim 11, wherein the disambiguating further comprises assigning a weight value to each of the wireless signals received from the plurality of wireless devices based on a difference between the second pressure at the mobile station and a pressure associated with a respective wireless device from which the wireless signal was received, and wherein determining the location on the determined floor is further based on the weight values.

13. A mobile station comprising:
an antenna;
a transceiver communicatively coupled to the antenna to transmit outbound wireless communications to, and receive inbound wireless communications from, a wireless transceiver;
a pressure sensor configured to determine atmospheric pressure on the mobile station; and
a processing unit communicatively coupled to the transceiver and the pressure sensor and configured to:
measure a first pressure at the mobile station at a first location within the structure;
measure a second pressure at the mobile station at a second location within the structure;
determine a pressure differential threshold based on the first location within the structure, the pressure differential threshold being indicative of a pressure difference between adjacent vertically displaced floors within a structure, or a substantial portion thereof;
make a determination, based on the second location relative to a floor transition within the structure, that a pressure differential between the first pressure and the second pressure exceeds the pressure differential threshold; and
disambiguate a location of the mobile station in response to the determination that the pressure differential between the first pressure and the second pressure exceeds the pressure differential threshold.

14. The mobile station of claim 13 wherein to disambiguate the location of the mobile station the processing unit is configured to:
obtain, at the mobile station, signals from a plurality of access points, the signals comprising a plurality of regional pressure indications and corresponding region indications indicating a plurality of regions within the structure that are vertically displaced with respect to each other, each of the plurality of regional pressure indications indicating atmospheric pressure information associated with a corresponding one of the plurality of regions;
compare at least one of the pressure differential or the second pressure with the plurality of regional pressure indications; and
determine in which of the plurality of regions within the structure the mobile station presently resides based on the comparison.

15. The mobile station of claim 14 wherein the plurality of regional pressure indications are pressure differential indications and the processing unit is configured to compare the pressure differential with the plurality of regional pressure indications.

16. The mobile station of claim 14 wherein to obtain the plurality of regional pressure indications, the transceiver and the processing unit are configured to receive the plurality of regional pressure indications from wireless transceivers.

17. The mobile station of claim 14 wherein to obtain the plurality of regional pressure indications, the transceiver and the processing unit are configured to receive the plurality of regional pressure indications from a wireless communication base station.

18. The mobile station of claim 14 wherein to obtain the plurality of regional pressure indications and the corresponding region indications, the transceiver and the processing unit are configured to receive the plurality of regional pressure indications and the corresponding region indications via peer-to-peer communications from other mobile stations.

19. The mobile station of claim 13 wherein the pressure differential threshold changes based on weather.

20. The mobile station of claim 13, wherein the processing unit is further configured to:
receive wireless signals from a plurality of wireless devices associated with the determined floor; and
determine, based on the wireless signals, a location on the determined floor as the location of the mobile station within the structure.

21. The method of claim 1, wherein the pressure differential threshold is indicative of the mobile station likely having moved between at least adjacent vertically displaced floors within the structure.

22. A computer-readable storage device comprising processor-readable instructions configured to cause a processor to:
measure a first pressure at a mobile station at a first location within the structure;
measure a second pressure at the mobile station at a second location within the structure;
determine a pressure differential threshold based on the first location within the structure, the pressure differential threshold being indicative of a pressure difference between adjacent vertically displaced floors within a structure, or a substantial portion thereof;

make a determination, based on the second location relative to a floor transition within the structure, that a pressure differential between the first pressure and the second pressure exceeds the pressure differential threshold; and disambiguate a location of the mobile station in response to the determination that the pressure differential between the first pressure and the second pressure exceeds the pressure differential threshold.

23. The storage device of claim 22 wherein to disambiguate the location of the mobile station the processor readable instructions are further configured to cause the processor to:

obtain, at the mobile station, signals from a plurality of access points, the signals comprising a plurality of regional pressure indications and corresponding region indications indicating a plurality of regions within the structure that are vertically displaced with respect to each other, each of the plurality of regional pressure indications indicating atmospheric pressure information associated with a corresponding one of the plurality of regions;

compare at least one of the pressure differential or the second pressure with the plurality of regional pressure indications; and determine in which of the plurality of regions within the structure the mobile station presently resides based on the comparison.

24. The storage device of claim 23 wherein the plurality of regional pressure indications are pressure differential indications and the instructions configured to cause the processor to compare are configured to cause the processor to compare the pressure differential with the plurality of regional pressure indications.

25. The storage device of claim 23 wherein the instructions configured to cause the processor to obtain the plurality of regional pressure indications are configured to cause the processor to identify the plurality of regional pressure indications from communications received from wireless transceivers.

26. The storage device of claim 23 wherein the instructions configured to cause the processor to obtain the plurality of regional pressure indications are configured to cause the processor to identify the plurality of regional pressure indications from communications received from a wireless communication base station.

27. The storage device of claim 23 wherein the instructions configured to cause the processor to obtain the plurality of regional pressure indications and the corresponding region indications are configured to cause the processor to identify the plurality of regional pressure indications and the corresponding region indications from peer-to-peer communications from other mobile stations.

28. The storage device of claim 22 wherein the pressure differential threshold changes based on weather.

29. A mobile station comprising:

means for measuring a first pressure at the mobile station at a first location within the structure;

means for measuring a second pressure at the mobile station at a second location within the structure;

determining a pressure differential threshold based on the first location within the structure, the pressure differential threshold being indicative of a pressure difference between adjacent vertically displaced floors within the structure, or a substantial portion thereof;

means for determining, based on the second location relative to a floor transition within the structure, that a pressure differential between the first pressure and the second pressure exceeds the pressure differential threshold; and means for disambiguating a location of the mobile station in response to a determination that the pressure differential between the first pressure and the second pressure exceeds the pressure differential threshold.

30. The mobile station of claim 29 wherein the means for disambiguating the location of the mobile station comprise:

means for obtaining, at the mobile station, signals from a plurality of access points, the signals comprising a plurality of regional pressure indications and corresponding region indications indicating a plurality of regions within the structure that are vertically displaced with respect to each other, each of the plurality of regional pressure indications indicating atmospheric pressure information associated with a corresponding one of the plurality of regions;

means for comparing at least one of the pressure differential or the second pressure with the plurality of regional pressure indications; and means for determining in which of the plurality of regions within the structure the mobile station presently resides based on the comparing.

31. The mobile station of claim 30 wherein the plurality of regional pressure indications are pressure differential indications and the means for comparing are for comparing the pressure differential with the plurality of regional pressure indications.

32. The mobile station of claim 30 wherein the means for obtaining signals is configured to receive the plurality of regional pressure indications from an entity external to the structure as part of location assistance data.

33. The mobile station of claim 30 wherein the means for obtaining signals is configured to receive the plurality of regional pressure indications and the corresponding region indications via peer-to-peer communications from other mobile stations.

34. The mobile station of claim 29 wherein the pressure differential threshold changes based on weather.

* * * * *